(12) United States Patent
Lu

(10) Patent No.: US 10,616,525 B2
(45) Date of Patent: Apr. 7, 2020

(54) CONTROL METHOD AND DEVICE OF SIGNAL SOURCE SWITCHING

(71) Applicant: SHENZHEN TCL DIGITAL TECHNOLOGY LTD., Shenzhen, Guangdong (CN)

(72) Inventor: Huiming Lu, Shenzhen (CN)

(73) Assignee: SHENZHEN TCL DIGITAL TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 16/345,161

(22) PCT Filed: Dec. 29, 2016

(86) PCT No.: PCT/CN2016/113016
§ 371 (c)(1),
(2) Date: Apr. 25, 2019

(87) PCT Pub. No.: WO2018/076532
PCT Pub. Date: May 3, 2018

(65) Prior Publication Data
US 2019/0289248 A1    Sep. 19, 2019

(30) Foreign Application Priority Data
Oct. 26, 2016 (CN) .......................... 2016 1 0950536

(51) Int. Cl.
*H04N 5/50* (2006.01)
*H04N 5/44* (2011.01)
(Continued)

(52) U.S. Cl.
CPC ............. *H04N 5/50* (2013.01); *H04N 5/4403* (2013.01); *H04N 21/4383* (2013.01);
(Continued)

(58) Field of Classification Search
CPC .... H04N 5/50; H04N 21/443; H04N 21/4622; H04N 21/44222; H04N 21/4383; H04N 5/4403
(Continued)

(56) References Cited

U.S. PATENT DOCUMENTS

| 5,896,130 A * | 4/1999 | Tsuchiya | H04N 5/44 725/37 |
| 7,872,692 B2 * | 1/2011 | Ginawi | H04N 7/163 348/461 |

(Continued)

FOREIGN PATENT DOCUMENTS

| CN | 101076095 | 11/2007 |
| CN | 101296333 | 10/2008 |

(Continued)

OTHER PUBLICATIONS

International search report dated Jul. 13, 2017 from corresponding application No. PCT/CN2016/113016.
(Continued)

*Primary Examiner* — Jefferey F Harold
*Assistant Examiner* — Humam M Satti
(74) *Attorney, Agent, or Firm* — Hauptman Ham, LLP

(57) ABSTRACT

Disclosed is a control method of source switching, including the following operations of: detecting a source signal when a source switching command is received; locking the detected source signal, when the source signal is detected; judging whether the source regarding the locked source signal is a source corresponding to a currently received source switching command; setting image and sound corresponding to the source and playing the source signal, when the source of the locked source signal is the source corresponding to the currently received source switching command. The present application further discloses a control
(Continued)

device of source switching. The control method of source switching can effectively prevent occurrence of inconsistency between the source of the locked signal and the current source during a rapid switching of the source.

14 Claims, 4 Drawing Sheets

(51) Int. Cl.
*H04N 21/438* (2011.01)
*H04N 21/442* (2011.01)
*H04N 21/462* (2011.01)
*H04N 21/443* (2011.01)

(52) U.S. Cl.
CPC ..... *H04N 21/443* (2013.01); *H04N 21/44222* (2013.01); *H04N 21/4622* (2013.01)

(58) Field of Classification Search
USPC ........... 348/552, 554, E3.049, 725, 731, 732
See application file for complete search history.

(56) References Cited

U.S. PATENT DOCUMENTS

| | | | |
|---|---|---|---|
| 8,026,981 B2* | 9/2011 | Jong | H04N 5/775 |
| | | | 348/552 |
| 2006/0209180 A1* | 9/2006 | Jang | H04N 5/4403 |
| | | | 348/14.05 |
| 2014/0013356 A1* | 1/2014 | Chen | H04N 21/482 |
| | | | 725/40 |

FOREIGN PATENT DOCUMENTS

| | | |
|---|---|---|
| CN | 101420558 | 4/2009 |
| CN | 103281590 | 9/2013 |
| CN | 105472439 | 4/2016 |
| CN | 105812916 | 7/2016 |
| CN | 105872768 | 8/2016 |
| WO | WO2012025039 | 3/2012 |

OTHER PUBLICATIONS

Office Action dated Mar. 12, 2019 from corresponding application No. CN 201610950536.9.

* cited by examiner

CONTROL METHOD AND DEVICE OF SIGNAL SOURCE SWITCHING

RELATED APPLICATIONS

The present application is a National Phase of International Application Number PCT/CN2016/113016, filed Dec. 29, 2016, and claims the priority of China Application No. 201610950536.9, filed Oct. 26, 2016.

TECHNICAL FIELD

The present application relates to the field of communication, in particular to a control method and device of signal source switching.

BACKGROUND

It has been well known of multiple signal sources in many video playback devices, television as an example. By selecting different signal sources, users may watch programs of various signal types. For example, TV signal source can be selected to watch TV programs transmitted by TV broadcast station; AV signal source can be selected for programs transmitted by set-top box; and HDMI signal sources for programs transmitted by DVD. The program of a certain signal source, which the user switches to, will be played if the signal source is open. However, switching the signal source, waiting the signal to lock after signal source switching, and playing the program of the signal source will each take a certain time. The normal procedures are: if signal source switching is successful, signal locking instruction is awaited. Afterwards, the signal locking message is received, followed by an image setting and a sound setting executed by the television and playing of the program regarding the signal source.

The aforementioned method, however, may possibly induce inconsistency between the signal source of the locked signal and the current signal source, when a rapid signal source switching is performed. For example, the user switches rapidly from the TV signal source to the AV signal source, then the user switches rapidly from the AV signal source back to the TV signal source, while waiting for the television to lock the signal of the AV signal source. Whereas the television receives the signal locking message from the AV signal source at the same time point, which makes the process flows disorder and causes the display messing up or crashing.

SUMMARY

The objective of the present application is to provide a control method of signal source switching, which aims at solving the inconsistency between the signal source of a locked signal and the current signal source when signal source is rapidly switched.

In order to achieve the aforementioned objective, the present application provides a control method of signal source switching, which includes the following operations:

detecting a signal of the signal source, when a signal source switching command is received;

locking the detected signal of the signal source, when the signal of the signal source is detected;

judging whether the signal source regarding the locked signal is a signal source corresponding to a signal source switching command that is currently received;

setting image and sound corresponding to the signal source and playing programs regarding the signal of the signal source, when the signal source regarding the locked signal is the signal source corresponding to the signal source switching command that is currently received.

Preferably, after the operation of locking the detected signal of the signal source, when the signal of the signal source is detected, the method further includes:

sending a signal locking message, and attaching a signal source identifier regarding the locked signal to the signal locking message.

Preferably, the operation of judging whether the signal source regarding the locked signal is a signal source corresponding to a signal source switching command that is currently received, includes:

receiving the signal locking message, and identifying the signal source identifier attached to the signal locking message;

judging whether the signal source regarding the locked signal is the signal source corresponding to the signal source switching command that is currently received, based on the identified signal source identifier.

Preferably, after the operation of judging whether the signal source regarding the locked signal is a signal source corresponding to a signal source switching command that is currently received, the method further includes:

ending a current signal locking operation, and detecting the signal of the signal source according to the signal source switching command that is currently received, when the signal source regarding the locked signal is not the signal source corresponding to the signal source switching command that is currently received.

Preferably, the signal source include AV signal source, TV signal source, and HDMI signal source.

In addition, in order to achieve the aforementioned objective, the present application further provides a control device of signal source switching, including:

a signal detecting module, configured for detecting a signal of the signal source when a signal source switching command is received;

a locking module, configured for locking the detected signal of the signal source when the signal of the signal source is detected;

a judging module, configured for judging whether the signal source regarding the locked signal is a signal source corresponding to a signal source switching command that is currently received;

a processing module, configured for setting image and sound corresponding to the signal source and play programs regarding the signal of the signal source, when the signal source regarding the locked signal is the signal source corresponding to the signal source switching command that is currently received.

Preferably, the control device further includes:

a message sending module, configured for sending a signal locking message and attach a signal source identifier corresponding to the locked signal to the signal locking message.

Preferably, the judging module includes:

a message receiving unit, configured for receiving the signal locking message;

a identifying unit, configured for identifying the signal source identifier attached to the signal locking message;

a judging unit, configured for judging whether the signal source regarding the locked signal is the signal source corresponding to the signal source switching command that is currently received, based on the identified signal source identifier.

Preferably, the processing module is further configured for:

ending a current signal locking operation, and detecting the signal of the signal source according to the signal source switching command that is currently received, when the signal source regarding the locked signal is not the signal source corresponding to the signal source switching command that is currently received.

Preferably, the signal source include AV signal source, TV signal source, and HDMI signal source.

The present application provides a control method of signal source switching, including the following operations of: detecting a signal of the signal source when a signal source switching command is received; locking the detected signal of the signal source, when the signal of the signal source is detected; judging whether the signal source regarding the locked signal is a signal source corresponding to a currently received signal source switching command; setting image and sound corresponding to the signal source and playing programs regarding the signal of the signal source, when the signal source of the locked signal is the signal source corresponding to the currently received signal source switching command. The control method can effectively prevent occurrence of inconsistency between the signal source of the locked signal and the current signal source induced in a rapid signal source switching. In the meanwhile, the present application is simple and easy to implement.

BRIEF DESCRIPTION OF THE DRAWINGS

In order to explain the embodiment of the present application or the technical solution of the prior art more clearly, the following will briefly introduce the drawings necessary in the description of the embodiments or the prior art. Obviously, the drawings in the following description are only some embodiments of the present application. For those ordinary skill in the art, other drawings can be obtained according to the structure shown in these drawings without any creative effort.

The implementation, functional features and advantages of the present application will be further described with reference to the accompanying drawings with the embodiments.

DETAILED DESCRIPTION OF THE EMBODIMENTS

It should be understood that the specific embodiments described herein are only for the purpose of explaining the present application and are not intended to limit the present application.

Figure 1:
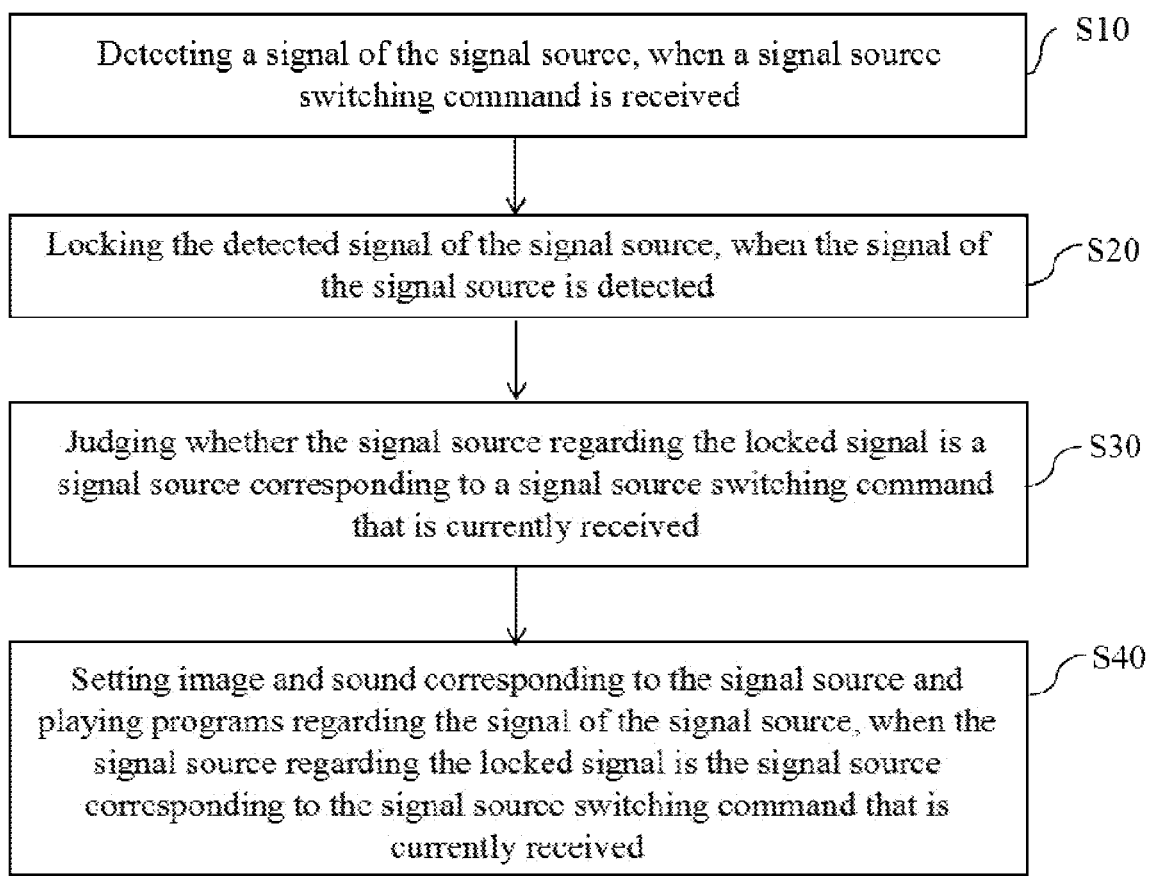
FIG. 1 is a schematic flow chart according to a first embodiment of a control method of the present application.

The present application provides a control method of signal source switching. Referring to FIG. 1, in one embodiment, the control method of signal source switching includes:

Step S10, detecting a signal of the signal source, when a signal source switching command is received.

According to the embodiment of the present application, the control method of signal source switching is mainly applicable for control of the signal locking process of the video playback device, and to prevent the device from messing up or crashing induced by the inconsistency between the signal source of the locked signal and the current signal source when the user rapidly switches the signal source of the video playback device. The control method of signal source switching of the present application will be described in detail by taking a television as an example in the following embodiments.

Specifically, for example, the user rapidly switches signal source of the television from the TV signal source to the AV signal source. And in the waiting process to lock signal of the AV signal source, the user switches rapidly from the AV signal source back to the TV signal source (i.e. the current signal source of the television is TV signal source). Whereas the television receives the signal locking message from the AV signal source at the same time point, inducing the inconsistency between the signal source of the locked signal and the current signal source (as the current signal source of the television is TV signal source, while the signal locked by the television is the signal of the AV signal source), which makes the process flows disorder and causes the television display to mess up or crash. According to the embodiment of the present application, the control method of signal source switching firstly detects the signal of the signal source when the signal source switching command is received, in order to solve the inconsistency between the signal source of the locked signal and the current signal source when the signal source is switched rapidly.

Step S20, locking the detected signal of the signal source, when the signal of the signal source is detected.

Specifically, a signal of the signal source being detected indicates that the signal source has a signal. According to the present embodiment of the present application, the control method of signal source switching locks the detected signal of the signal source when it is detected. It should be noted that it is a conventional technique that television locks the detected signal of the signal source, which would be not repeated herein.

Step S30, judging whether the signal source regarding the locked signal is a signal source corresponding to a signal source switching command that is currently received.

Step S40, setting image and sound corresponding to the signal source and playing programs regarding the signal of the signal source, when the signal source regarding the locked signal is the signal source corresponding to the signal source switching command that is currently received.

Specifically, according to the embodiment of the present application, the control method of signal source switching judges whether the signal source regarding the locked signal is a signal source corresponding to a signal source switching command that is currently received, after the detected signal of the signal source is locked, in order to prevent the occurrence of the inconsistency between the signal source of the locked signal and the current signal source induced when the signal source is switched rapidly. In the present embodiment, the signal source switching command currently received by the television is the last signal source switching command received by the television. For example, in one embodiment, the user rapidly switches the signal source of the television from the TV signal source to the AV signal source. That is, in the present embodiment, the signal source switching command currently received by the television is the AV signal source command, that is, the current signal source of the television is the AV signal source. In another embodiment, the user rapidly switches from the TV signal source to the AV signal source, and in the waiting process to lock signal of the AV signal source, the user switches rapidly from the AV signal source back to the TV signal source. That is, the signal source switching command currently received is TV signal source command, and the current signal source of the television is TV signal source. According to that control method of the embodiment of the present application, image and sound corresponding to the signal source are set and the signal of the signal source is played, when the signal source regarding the locked signal is the signal source corresponding to the signal source switching command that is currently received. A current signal locking operation is ended, and the signal of the signal source is redetected according to the signal source switching command that is currently received, when the signal source regarding the locked signal is not the signal source corresponding to the signal source switching command that is currently received. For example, in one embodiment, the user rapidly switches the signal source of the television from the TV signal source to the AV signal source, that is, in the present embodiment, the signal source switching command currently received by the television is the AV signal source command, and the current signal source of the television is the AV signal source. If the signal source is the AV signal source corresponding to the signal currently locked by the television, which means, the signal source of the locked signal is the signal source corresponding to the signal source switching command currently received by the television (that is, the AV signal source command). Thus it can be judged that the locked signal source is the AV signal source, the image and sound corresponding to the AV signal source are set and the program of the AV signal source is played. In another embodiment, the user rapidly switches from the TV signal source to the AV signal source, and in the waiting process to lock signal of the AV signal source, the user switches rapidly from the AV signal source back to the TV signal source. That is, the signal source switching command currently received is TV signal source command, and the current signal source of the television is TV signal source. If the signal source is the AV signal source corresponding to the signal currently locked by the television, which means, the signal source of the locked signal is not the signal source corresponding to the signal source switching command currently received by the television (that is, the TV signal source command). Thus it can be judged that signal source corresponding to the locked signal is inconsistent with the current signal source. A current signal locking operation is ended, and the signal of the signal source is redetected according to the signal source switching command that is currently received.

According to that control method of the embodiment of the present application, it is judged whether the signal source regarding the locked signal is a signal source corresponding to a signal source switching command that is currently received, which means it is judged whether the locked signal source is the current signal source of the television. The image and sound corresponding to the signal source are set and the signal of the signal source is played, when the signal source regarding the locked signal is the signal source corresponding to the signal source switching command that is currently received. A current signal locking operation is ended, and the signal of the signal source is redetected according to the signal source switching command that is currently received, when the signal source regarding the locked signal is not the signal source corresponding to the signal source switching command that is currently received. So that the occurrence of the inconsistency is prevented between the signal source of the locked signal and the current signal source induced when the signal source is switched rapidly.

Figure 2:
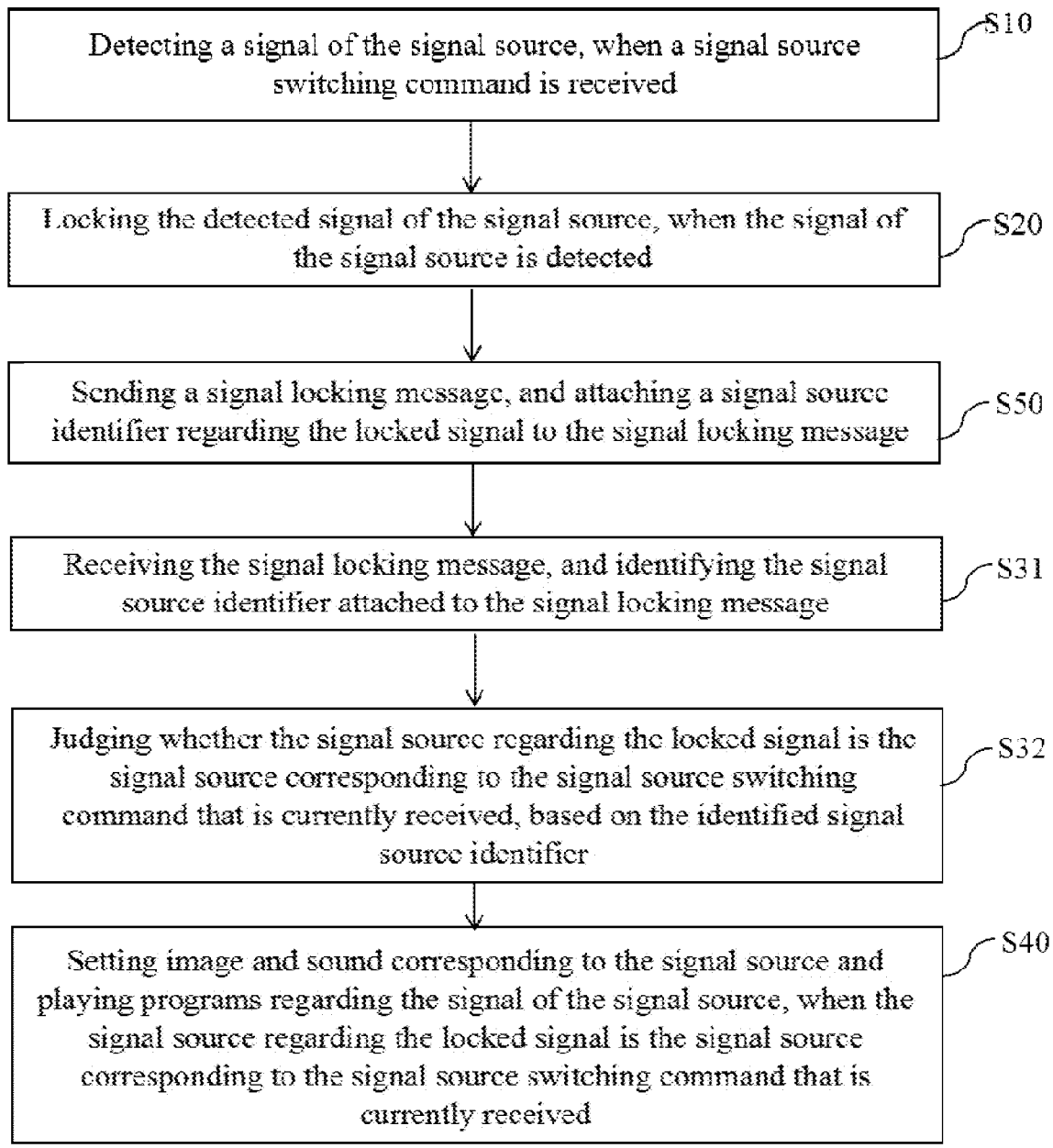
FIG. 2 is a schematic flow chart according to a second embodiment of the control method of the present application.

Further, referring to FIG. 2, based on the first embodiment of the control method of signal source switching of the present application, in the second embodiment of the control method of signal source switching of the present application, the aforementioned step S20 further includes:

Step S50, sending a signal locking message, and attaching a signal source identifier regarding the locked signal to the signal locking message.

The step S30 includes:

Step S31, receiving the signal locking message, and identifying the signal source identifier attached to the signal locking message;

Step S32, judging whether the signal source regarding the locked signal is the signal source corresponding to the signal source switching command that is currently received, based on the identified signal source identifier.

Specifically, in one embodiment, when a user rapidly switches from an AV signal source to a TV signal source, the television detects and locks the signal of the TV signal source, followed by sending a signal locking message. And a signal source identifier corresponding to the locked signal is attached to the signal locking message. That is, the TV signal source is identified as the signal source of the locked signal. Whereas the current signal source of the television is the TV signal source. The signal source corresponding to the locked signal is also a TV signal source, i.e. the signal source of the locked signal is consistent with the current signal source. Then the image and sound corresponding to the signal source are set and the signal of the signal source is played, i.e. the image and sound corresponding to the TV signal source are set and the program of the TV signal source is played. In another embodiment, the user rapidly switches the signal source of the television from the TV signal source to the AV signal source, and then the user rapidly switches the signal source back to the TV signal source. In the process of switching the signal source, the television detects the signal of the AV signal source, therefore locks the signal of the AV signal source, followed by sending a signal locking message. Moreover, the signal source identifier corresponding to the locked signal is attached to the signal locking message. Which means, the signal source of the locked signal is identified as an AV signal source, whereas the current signal source of the television is a TV signal source. The signal source corresponding to the locked signal is an AV signal source, inducing discrepancy of the signal source of the locked signal with the current signal source. The current signal locking process is ended, and the signal of the signal source is redetected according to the currently received signal source switching command.

In the present embodiment, when the television receives the signal locking message, it is judged that whether the signal source regarding the locked signal is the signal source corresponding to the signal source switching command that is currently received, based on the identified signal source identifier, i.e. It is judged that if the signal source regarding the locked signal is the current signal source. The device is prevented the induced inconsistency from messing up or crashing between the signal source of the locked signal and the current signal source, when the user rapidly switches the signal source of the video playback device.

Figure 3:
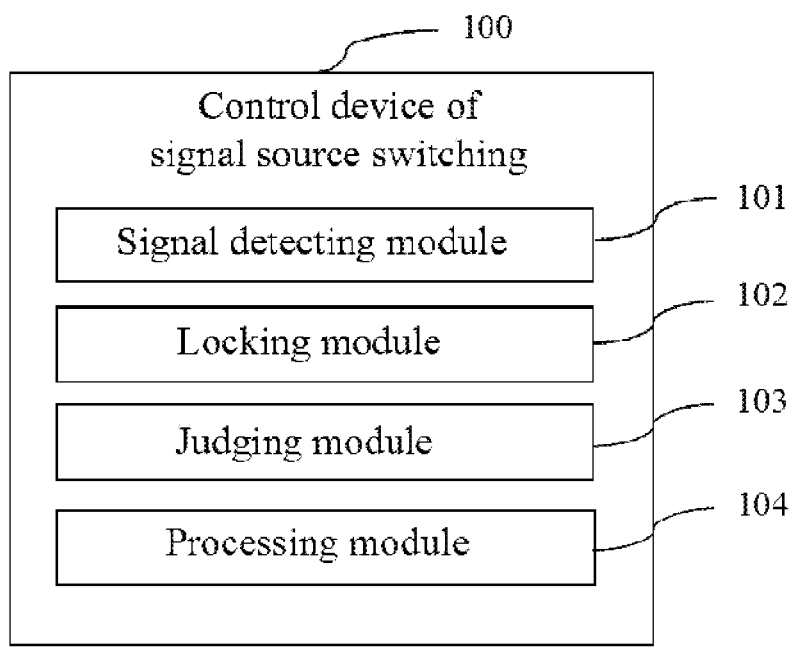
FIG. 3 is a schematic diagram of a functional modules according to the first embodiment of the control device of the present application.

The present application further provides a control method of signal source switching. Referring to FIG. 3, in one embodiment, the control device of signal source switching 100 includes: a signal detecting module 101, a locking module 102, a judging module 103, and a processing module 104.

Specifically, the signal detecting module 101, is configured for detecting a signal of the signal source when a signal source switching command is received.

The control device of signal source switching provided by the embodiment of the present application aims to prevent the device from messing up or crashing induced by the inconsistency between the signal source of the locked signal and the current signal source when the user rapidly switches the signal source of the video playback device. The control device of signal source switching of the present application will be described in detail by taking a television as an example in the following embodiments. Specifically, for example, the user rapidly switches signal source of the television from the TV signal source to the AV signal source. And in the waiting process to lock signal of the AV signal source, the user switches rapidly from the AV signal source back to the TV signal source (i.e. the current signal source of the television is TV signal source). Whereas the television receives the signal locking message from the AV signal source at the same time point, inducing the inconsistency between the signal source of the locked signal and the current signal source (as the current signal source of the television is the TV signal source, while the signal locked by the television is the signal of the AV signal source), which makes the process flows disorder and causes the television display to mess up or crash. According to the embodiment of the present application, the signal detecting module 101 firstly detects the signal of the signal source when receiving the signal source switching command, in order to solve the inconsistency between the signal source of the locked signal and the current signal source when the signal source is switched rapidly by the user.

The locking module 102, is configured for locking the detected signal of the signal source when the signal of the signal source is detected.

Specifically, a signal of the signal source being detected by the signal detecting module 101 indicates that the signal source has a signal. According to the control device of signal source switching regarding the present embodiment of the present application, the locking module 102 locks the detected signal of the signal source when it is detected by the signal detecting module 101. It should be noted that it is a conventional technique that the locking module 102 locks the detected signal of the signal source, which would be not repeated herein.

The judging module 103, is configured for judging whether the signal source regarding the locked signal is a signal source corresponding to a signal source switching command that is currently received.

The processing module 104, is configured for setting image and sound corresponding to the signal source and play programs regarding the signal of the signal source, when the signal source regarding the locked signal is the signal source corresponding to the signal source switching command that is currently received.

Specifically, according to the control device of signal source switching (television) regarding the embodiment of the present application, the judging module 103 judges whether the signal source regarding the signal of the signal source locked by the locking module 102, is a signal source corresponding to a signal source switching instruction that is currently received, after the detected signal of the signal source is locked by the locking module 102, in order to prevent the occurrence of the inconsistency between the signal source of the locked signal and the current signal source induced when the signal source is switched rapidly. In the present embodiment, the signal source switching command currently received by the television is the last signal source switching command received by the television. For example, in one embodiment, the user rapidly switches the signal source of the television from the TV signal source to the AV signal source, which is, in the present embodiment, the signal source switching command currently received by the television is the AV signal source command, i.e. the current signal source of the television is the AV signal source. In another embodiment, the user rapidly switches from the TV signal source to the AV signal source, and in the waiting process to lock signal of the AV signal source, the user switches rapidly from the AV signal source back to the TV signal source. That is, the signal source switching command currently received is the TV signal source command, and the current signal source of the television is the TV signal source. In the embodiment of the present application, when the judging module 103 judges that the signal source of the locked signal is the signal source corresponding to the signal source switching command currently received, the processing module 104 sets the image and sound corresponding to the signal source and plays the signal of the signal source. If the judging module 103 judges that the signal source of the locked signal is not the signal source corresponding to the signal source switching command currently received, the processing module 104 ends the current signal locking process, and the signal detecting module 101 redetects the signal of the signal source according to the received signal source switching command when receiving the signal source switching command. For example, in one embodiment, the user rapidly switches the signal source of the television from the TV signal source to the AV signal source, that is, in the present embodiment, the signal source switching command currently received by the television is the AV signal source command, and the current signal source of the television is the AV signal source. If the signal source is the AV signal source corresponding to the signal source currently locked by the television, which means, the signal source regarding the signal locked by the locking module 102 is the signal source corresponding to the signal source switching command currently received by the television (that is, the AV signal source command). Thus the judging module 103 judges that the locked signal source is the AV signal source, and the processing module 104 set the image and sound corresponding to the AV signal source and play the program of the AV signal source. In another embodiment, the user rapidly switches from the TV signal source to the AV signal source, and in the waiting process to lock signal of the AV signal source, the user switches rapidly from the AV signal source back to the TV signal source. That is, the signal source switching command currently received is the TV signal source command, and the current signal source of the television is the TV signal source. If the signal source is the AV signal source corresponding to the signal currently locked by the television, which means, the signal source regarding the signal locked by the locking module 102 is not the signal source corresponding to the signal source switching command currently received by the television (that is, the TV signal source command) Thus the judging module 103 judges that signal source corresponding to the signal of the signal source locked by the locking module 102 is inconsistent with the current signal source. The processing module ends the current signal locking operation, and the signal detecting module 101 redetects the signal of the signal source, according to the signal source switching command that is currently received when receiving the signal source switching command.

According to the control method of the embodiment of the present application, the judging module 103 judges whether the signal source regarding the signal of the signal source locked by the locking module 102 is a signal source corresponding to a signal source switching command that is currently received, which means it is judged whether the signal source from which the signal the locking module 102 locks is the current signal source of the television. The processing module sets the image and sound corresponding to the signal source and plays the signal of the signal source, when the judging module 103 judges the signal source regarding the locked signal is the signal source corresponding to the signal source switching command that is currently received. The processing module 104 ends the current signal locking operation, the signal detecting module 101, when receiving the signal source switching command, redetects the signal of the signal source according to the signal source switching command that is currently received, if the judging module 103 judges that the signal source regarding the locked signal is not the signal source corresponding to the signal source switching command that is currently received. As such, the control device of signal source switching (television) can prevent the occurrence of the inconsistency between the signal source of the locked signal and the current signal source induced when the signal source is switched rapidly.

Figure 4:
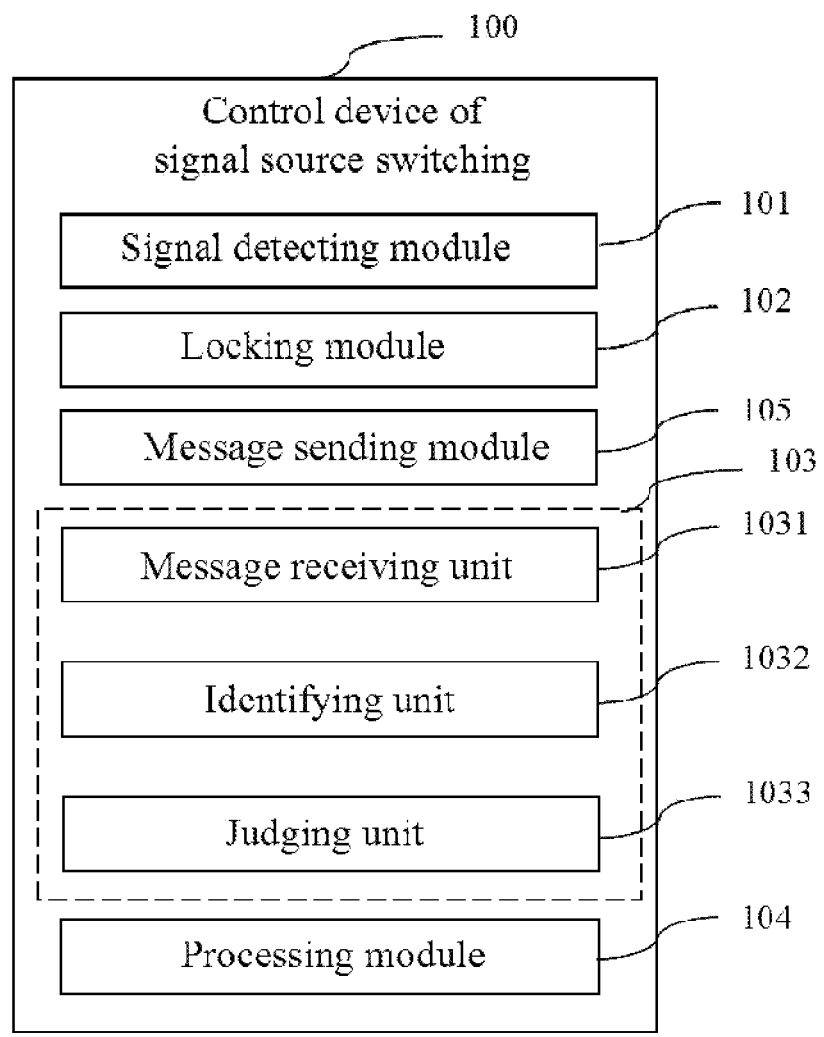
FIG. 4 is a schematic diagram of a functional modules according to the second embodiment of the control device of the present application.

Further, referring to FIG. 4, based on the first embodiment of the control device of signal source switching of the present application, in the second embodiment of the control device of signal source switching of the present application, the control device of signal source switching further includes a message sending module 105.

Specifically, the message sending module, is configured for sending a signal locking message and attach a signal source identifier corresponding to the locked signal to the signal locking message.

The judging module 103 includes a message receiving unit 1031, an identifying unit 1032, and a judging unit 1033.

Specifically, the message receiving unit 1031 is configured for receiving the signal locking message.

The identifying unit 1032 is configured for identifying the signal source identifier attached to the signal locking message;

The judging unit 1033, is configured for judging whether the signal source regarding the locked signal is the signal source corresponding to the signal source switching command that is currently received, based on the identified signal source identifier.

Specifically, in one embodiment, when a user switches rapidly from AV signal source to TV signal source, and the signal detecting module 101 detects the signal of the TV signal source, the locking module 102 locks the signal of the TV signal source. After the locking module 102 locks the signal of the TV signal source, the message sending module 105 sends a signal locking message, and attach the signal source identifier corresponding to the locked signal to the signal locking message. The signal source identifier is TV, which means that the signal source of the locked signal is a TV signal source. After the message sending module 105 sends a signal locking message, the message receiving unit 1031 receives the signal locking message. Then the identifying unit 1032 identifies the signal source identifier attached to the signal locking message to identify the signal source corresponding to the lock signal as a TV signal source. According to the signal source identifier identified by the identifying unit 1032, it is judged that whether the signal source of the locked signal is the signal source corresponding to the currently received signal source switching command (i.e. whether the signal source corresponding to the locked signal is a TV signal source). In the present embodiment, the judging unit 1033 may judge that the signal source of the locked signal (TV signal source) is consistent with the current signal source (also TV signal source). As such, the processing module 104 sets the image and sound corresponding to the signal source and plays the signal of the signal source, that is, in the present embodiment, the processing module 104 sets the image and sound corresponding to the TV signal source and plays the program of the TV signal source. In another embodiment, the user rapidly switches the TV signal source from the TV signal source to the AV signal source, and then the user rapidly switches the signal source back to the TV signal source. In the process of switching the signal source by the user, the locking module 102 locks the signal of the AV signal source, when the signal detecting module 101 detects the signal of the AV signal source. Then the message sending module 105 sends a signal locking message, and a signal source identifier corresponding to the locked signal is attached to the signal locking message. The signal source identifier is AV, which means that the signal source of the locked signal is AV signal source. After the message sending module 105 sends a signal locking message, the message receiving unit 1031 receives the signal locking message, and then the identifying unit 1032 identifies the signal source identifier attached to the signal locking message to identify the signal source corresponding to the lock signal as an AV signal source. The judging unit 1033 judges whether the signal source identifier identified by the identifying unit 1032 is AV signal source, and judges whether the signal source of the lock signal is the signal source corresponding to the currently received signal source switching command (i.e., whether the signal source corresponding to the lock signal is TV signal source). In the present embodiment, the judging unit 1033 may judge that the signal source of the lock signal (the signal source of the lock signal is an AV signal source) is inconsistent with the current signal source (the current signal source is a TV signal source). As such, the processing module 104 ends the current signal locking process, and the signal detecting module 101 redetects the signal of the signal source according to the received signal source switching command when receiving the signal source switching command.

In the present embodiment, when the message receiving unit 1031 receives the signal locking message sent by the message sending module 105, the judging unit 1033 may judge whether the signal source of the lock signal is the signal source corresponding to the signal source switching command currently received, i.e. whether the signal source corresponding to the locked signal is the current signal source, according to the signal source identifier attached to the signal locking message identified by the identifying unit 1032. Thus, it is prevented that the occurrence of the inconsistency between the signal source of the locked signal and the current signal source induced when the signal source is switched rapidly.

The above is only the preferred embodiment of the present application and is not therefore limiting the scope of the present application. Any equivalent structure or process change made by using the contents of the present specification and drawings, or directly or indirectly applied in other related technical fields, shall be included in the protection scope of the present application.

What is claimed is:

1. A control method of signal source switching, wherein, the control method comprises the following operations:
   detecting a signal of a signal source to be switched to, when a signal source switching command is received;
   locking the detected signal of the signal source to be switched to, when the signal of the signal source to be switched to is detected;
   judging whether the signal source to be switched to regarding the locked signal is a signal source corresponding to the signal source switching command that is currently received;
   setting image and sound corresponding to the signal source to be switched to and displaying the signal of the signal source to be switched to, when the signal source to be switched to regarding the locked signal is the signal source corresponding to the signal source switching command that is currently received.

2. The control method of claim 1, wherein, after the operation of locking the detected signal of the signal source, when the signal of the signal source is detected, the method further comprises:
   sending a signal locking message, and attaching a signal source identifier corresponding to the locked signal to the signal locking message.

3. The control method of claim 2, wherein, the operation of judging whether the signal source regarding the locked signal is a signal source corresponding to the signal source switching command that is currently received, comprises:
   receiving the signal locking message, and identifying the signal source identifier attached to the signal locking message;
   judging whether the signal source regarding the locked signal is the signal source corresponding to the signal source switching command that is currently received, based on the identified signal source identifier.

4. The control method of claim 3, wherein, after the operation of judging whether the signal source regarding the locked signal is the signal source corresponding to a signal source switching command that is currently received, the method further comprises:
   ending a current signal locking operation, and detecting the signal of the signal source according to the signal source switching command that is currently received, when the signal source regarding the locked signal is not the signal source corresponding to the signal source switching command that is currently received.

5. The control method of claim 2, wherein, after the operation of judging whether the signal source regarding the locked signal is the signal source corresponding to a signal source switching command that is currently received, the method further comprises:
   ending a current signal locking operation, and detecting the signal of the signal source according to the signal source switching command that is currently received, when the signal source regarding the locked signal is not the signal source corresponding to the signal source switching command that is currently received.

6. The control method of claim 1, wherein, after the operation of judging whether the signal source regarding the locked signal is the signal source corresponding to a signal source switching command that is currently received, the method further comprises:
   ending a current signal locking operation, and detecting the signal of the signal source according to the signal source switching command that is currently received, when the signal source regarding the locked signal is not the signal source corresponding to the signal source switching command that is currently received.

7. The control method of claim 1, wherein, the signal source comprises an AV signal source, a TV signal source, and a HDMI signal source.

8. A control device of signal source switching, wherein, the control device comprises a processor and a memory, wherein the processor executes instructions stored in the memory to implement:
   detecting a signal of a signal source when a signal source switching command is received;
   locking the detected signal of the signal source to be switched to, when the signal of the signal source to be switched to is detected;
   judging whether the signal source to be switched to regarding the locked signal is a signal source corresponding to the signal source switching command that is currently received; and
   setting image and sound corresponding to the signal source to be switched to and displaying the signal of the signal source to be switched to, when the signal source to be switched to regarding the locked signal is the signal source corresponding to the signal source switching command that is currently received.

9. The control device of claim 8, wherein, the processor executes instructions stored in the memory to further implement:
   sending a signal locking message and attach a signal source identifier corresponding to the locked signal to the signal locking message.

10. The control device of claim 9, wherein, the processor executes instructions stored in the memory to further implement:
    receiving the signal locking message;
    identifying the signal source identifier attached to the signal locking message; and
    judging whether the signal source regarding the locked signal is the signal source corresponding to the signal source switching command that is currently received, based on the identified signal source identifier.

11. The control device of claim 10, wherein, the processor executes instructions stored in the memory to further implement:
    ending a current signal locking operation, and detecting the signal of the signal source according to the signal source switching command that is currently received, when the signal source regarding the locked signal is not the signal source corresponding to the signal source switching command that is currently received.

12. The control device of claim 9, wherein, the processor executes instructions stored in the memory to further implement:
    ending a current signal locking operation, and detecting the signal of the signal source according to the signal source switching command that is currently received, when the signal source regarding the locked signal is not the signal source corresponding to the signal source switching command that is currently received.

13. The control device of claim 8, wherein, the processor executes instructions stored in the memory to further implement:
    ending a current signal locking operation, and detecting the signal of the signal source according to the signal source switching command that is currently received, when the signal source regarding the locked signal is not the signal source corresponding to the signal source switching command that is currently received.

14. The control device of claim 8, wherein, the signal source comprises an AV signal source, a TV signal source, and a HDMI signal source.

\* \* \* \* \*